March 25, 1924.

H. E. BRONSON

TRAP

Filed Nov. 28, 1922        2 Sheets-Sheet 1

1,488,312

Inventor
H. E. Bronson.
Attorney

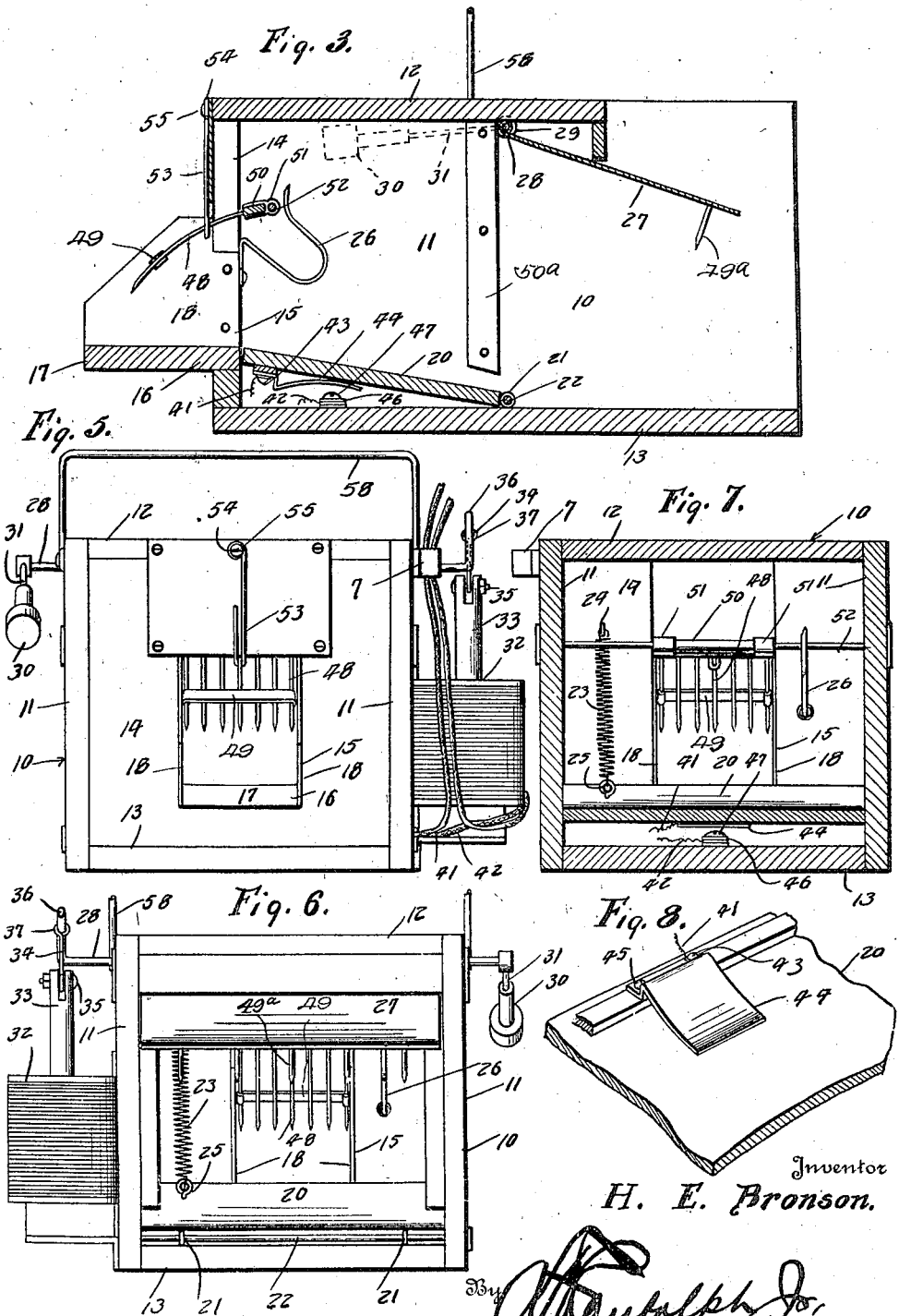

Patented Mar. 25, 1924.

1,488,312

UNITED STATES PATENT OFFICE.

HARRY E. BRONSON, OF MINERAL, WASHINGTON.

TRAP.

Application filed November 28, 1922. Serial No. 603,799.

*To all whom it may concern:*

Be it known that I, HARRY E. BRONSON, a citizen of the United States, residing at Mineral, in the county of King and State of Washington, have invented certain new and useful Improvements in a Trap; and I do hereby declare the following to be a full, clear, and exact description of the invention, such as will enable others skilled in the art to which it appertains to make and use the same.

This invention relates to an animal trap.

It is aimed to provide a novel construction of trap which is adapted for catching rodents and other animals, and is automatically operable.

Another object is to provide a construction which is operable by electro-magnetic means and adapted to have the electric circuit closed by the weight of one or more captives.

It is further aimed to provide a construction utilizing a movable base, means to normally uphold the same and to be overcome by predetermined weight thereon in combination with a closure for the trap adapted to have an operating circuit therefor closed through the lowering movement of the base.

Various additional and specific objects and advantages will be pointed out and become apparent from a consideration of the description following taken in connection with accompanying drawings illustrating one practical embodiment.

In said drawings:—

Figure 3 is a substantially central longitudinal sectional view taken on the line 3—3 of Figure 1;

Figure 5 is a front elevation;

Figure 6 is a rear elevation;

Figure 7 is a transverse sectional view on the line 7—7 of Figure 1 and looking toward the front of the trap; and Figure 8 is a perspective view of the base, shown inverted in order to disclose the contact thereon.

Like reference characters designate like or similar parts in the different views.

Figure 1:
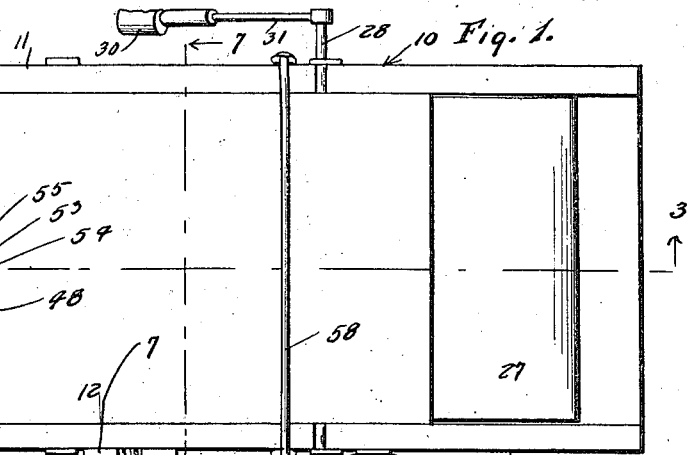
Figure 1 is a plan view.
Figure 2:
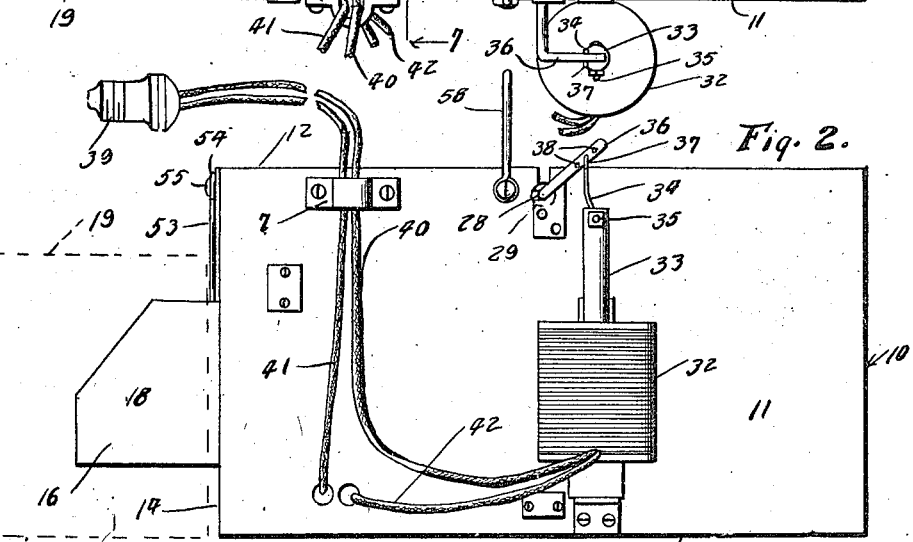
Figure 2 is a side elevation.
Figure 4:
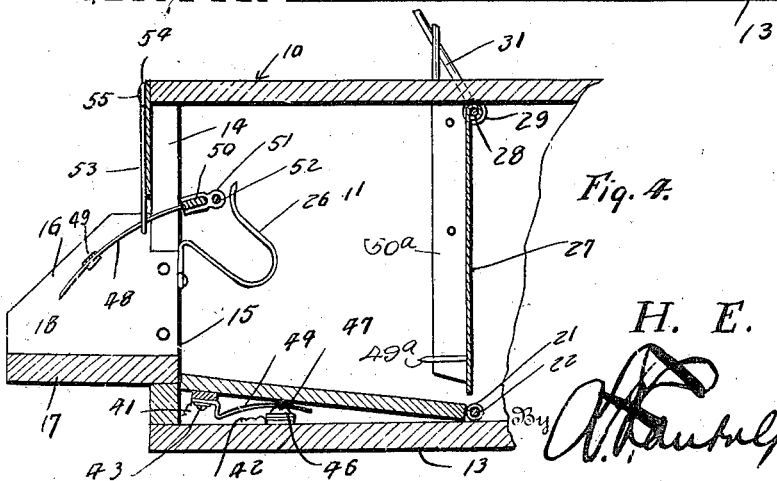
Figure 4 is a fragmentary longitudinal sectional view similar to Figure 3 but showing parts in circuit-closing position.

In carrying out the invention, the trap has a suitable casing 10 which may be of any approved construction and material, for instance substantially rectangular and of wood. This casing has side walls 11, top and bottom walls 12 and 13, respectively, and a front end wall 14. Wall 14 is provided with a trap opening 15 therethrough and projecting beyond the same and suitably secured to the wall 14 is a chute 16 comprising a base wall 17 and side walls 18. A catching cage or the like is suggested at 19 and into the same the chute 16 is adapted to project. The rear end of the casing 10 is normally open to allow an animal to pass through the same into casing 10 and escape therefrom through the opening 15, chute 16 and into the cage 19.

Located within the casing 10 is a movable base 20 from which eyelets 21 extend at the rear end thereof and which are journaled on a rod 22 spanning the walls 11 and suitably fastened therein. The rear or hinge end of base 20 is arranged as close as possible to the bottom wall 13 while the forward or free end of the base 20 is normally disposed substantially at the same level as the base wall 17. Said base 20 is normally held in the last mentioned position by means of a coil spring 23 which has one terminal fastened in a suitable manner as to an eyelet 24 fastened to wall 14 and its other terminal as by means of an eyelet at 25 fastened to the base. The tension of the spring 23 is such that the base will swing downwardly upon the imposition of a predetermined weight thereon, for instance the weight of a single rat or animal or of a plurality of rats or animals as predetermined.

Suitably fastened within the casing as to the wall 14 is a hook 26 to which one or more kinds of bait is fastened in order to lure the animals into the casing.

A means is provided to close the rear or entrance end of the casing through depending movement of the base 20 so as to frighten the animals and cause them to travel through the chute 16 and into the cage 19. To this end, a closure plate 27 is utilized which is fastened at its upper end rigidly to a rod 28 which is journaled on the side wall 11 and prevented from displacing movement by means of nuts or enlargements 29 thereon. This closure plate 27 is normally held in a raised position as shown in full lines in the drawings by means of a weight 30 carried by an arm 31 extending laterally from the rod 28 at one side of the casing.

Fastened to the other side of the casing in any suitable manner is a solenoid or electro-magnet 32 which has a movable core or plunger 33 slidable longitudinally thereof. By means of a link 34, pivoted to the core 33 as at 35 and loosely and adjustably connected to a crank arm or extension 36 of the rod 28 by means of a hook 37 and opening 38, said core 33 is normally held in a raised position.

Any suitable means, adapted to be closed by the lowering movement of the base 20 may be utilized to energize the magnet 32. For instance, in the form shown, the electric energy is adapted to be obtained from a house lighting or equivalent system by screwing a plug 39 removably into a socket thereof. A conductor 40 may extend from the plug 39 to the winding of the magnet 32 while conductors 41 and 42 may extend from the winding of magnet 32 and the plug 39 respectively. Conductor 41 is fastened by a binding post 43 to a contact 44 secured as at 45 to the under surface of the base 20. Contact 44 is preferably of spring metal and at its free portion is adapted to engage a contact 46 through downward movement of the base. Contact 46 may be fastened in place by a bolt 47, serving as a binding post and to which the conductor 42 leads.

An articulate snare 48 may be disposed in the chute 16 as shown and comprise brace rods 49 and 50 secured together by means of and soldered to or otherwise fastened to a transverse bar 50. The bar 50 is located at the upper end of the snare and pivoted by means of barrels 51 to a rod 52 spanning and mounted in the walls 11. Said snare is held at the proper height by means of a bail 53 having an eyelet 54 at one end through which a fastening 55 may be passed to secure it to the casing. The other end of the bail is hook shaped and one of the rods 22 passes therethrough. Said rods normally rest on the bridge portion of the hook and limit downward movement of the snare. At the same time, the hook will permit movement of the snare to a limited extent, in view of the elongation of the hook.

A guide bracket 7 for the conductors 40 and 42 may be secured to one of the walls 11 if desired.

A handle or bail as at 58 may be suitably fastened to the casing to facilitate portage thereof.

In operation, with the plug 39 connected into a socket or the contacts 42 and 44 otherwise in an electric circuit, and with the hook 26 appropriately baited, the animal will pass into the trap under the plate 27 and on to the base 20. The spring 23 is so tensioned as to elongate under the weight of a single animal or of a number of them as preferred. When said base 20 descends or swings downwardly, contact 44 engages the contact 46 and thus an electric circuit is established from the source through the electro-magnet 32. The coil or winding of the magnet being thus energized attracts the core 33 and thus causes the link 34 to shift the crank arm 36 and accordingly move the plate 27 to a closed position, counter to the urgency of the weight at 30. The plate 27 thus being closed, will frighten the animal or animals causing them to run through the opening 15 and chute 16 into the cage 19. As the animals move through the chute 16, they engage and elevate the snare 48 at its free end so that it will be relatively low at its free end and serve as a barrier to prevent escape of animals from the cage 19 back through the chute 16. Upon the animals running off of the base 20, it will be relieved of their weight and restored to a normal position by the spring 23, thus disengaging contacts 44 and 46, deenergizing the electromagnet 32 so that the weight 30 will tilt the rod 28 and restore the core 33 and plate 27 to raised or normal position.

To prevent animals moving toward the plate 27 as it closes, a plurality of tines 49$^a$ may extend inwardly from the plate 27. Said plate 27 may also abut strips 50$^a$ secured to the inner surfaces of the side walls 11, when the plate 27 reaches a closed position.

As merely one operative embodiment has been illustrated and described, it is to be understood that changes in the details may be resorted to provided they fall within the spirit and scope of the invention.

I claim as my invention:—

A trap having a normally open closure, a rod adjacent the top of and pivotally mounting said closure, a return weight associated with said rod, a crank associated with said rod, an electro-magnet on a side of the trap having a movable core operatively associated with said crank, a base pivoted within the trap and movable under the weight of a captive, cooperating contacts within the trap one carried by said base and normally disengaged from the other, the contacts being in an electric circuit with said magnet and adapted for engagement through the weight of an animal on the base, escape means for the trap for communication with a cage raised above the bottom of the trap, the base normally extending upwardly and rearwardly, toward said escape means, and said closure being movable rearwardly and downwardly toward said base through energization of said magnet.

In testimony whereof I affix my signature in presence of two witnesses.

HARRY E. BRONSON.

Witnesses:
 JESSE SIMMONS,
 JENNIE SIMMONS.